Figure 1:
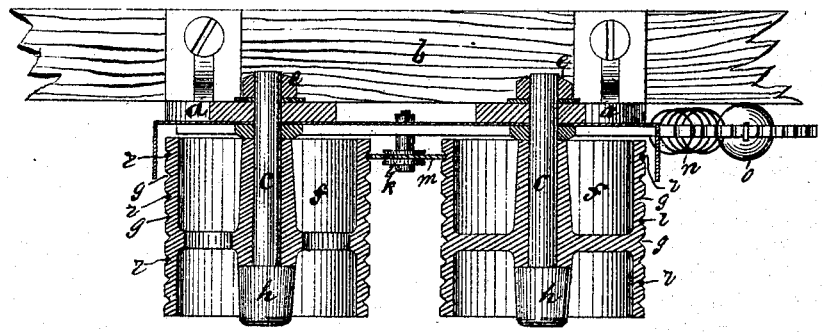

John N. Leonard.
Silk Stretching Machinery

No. 116461 — Patented Jun 27 1871

Witnesses
E. W. Bliss
Jeremy W. Bliss

Inventor
John N. Leonard

UNITED STATES PATENT OFFICE.

JOHN N. LEONARD, OF ROCKVILLE, CONNECTICUT.

IMPROVEMENT IN MACHINES FOR STRETCHING SILK.

Specification forming part of Letters Patent No. 116,461, dated June 27, 1871.

*To all whom it may concern:*

Be it known that I, JOHN N. LEONARD, of Rockville, county of Tolland and State of Connecticut, have invented certain new and useful Improvements in Silk-Stretching Machinery; and to enable others skilled in the art to make and use the same I will proceed to describe, referring to the drawing, in which the same letters indicate like parts in each of the figures.

The nature of this invention consists in drawing or stretching the fiber or straws from one bobbin to another over rollers of about equal diameter, producing the stretch by tension.

Figure 2:
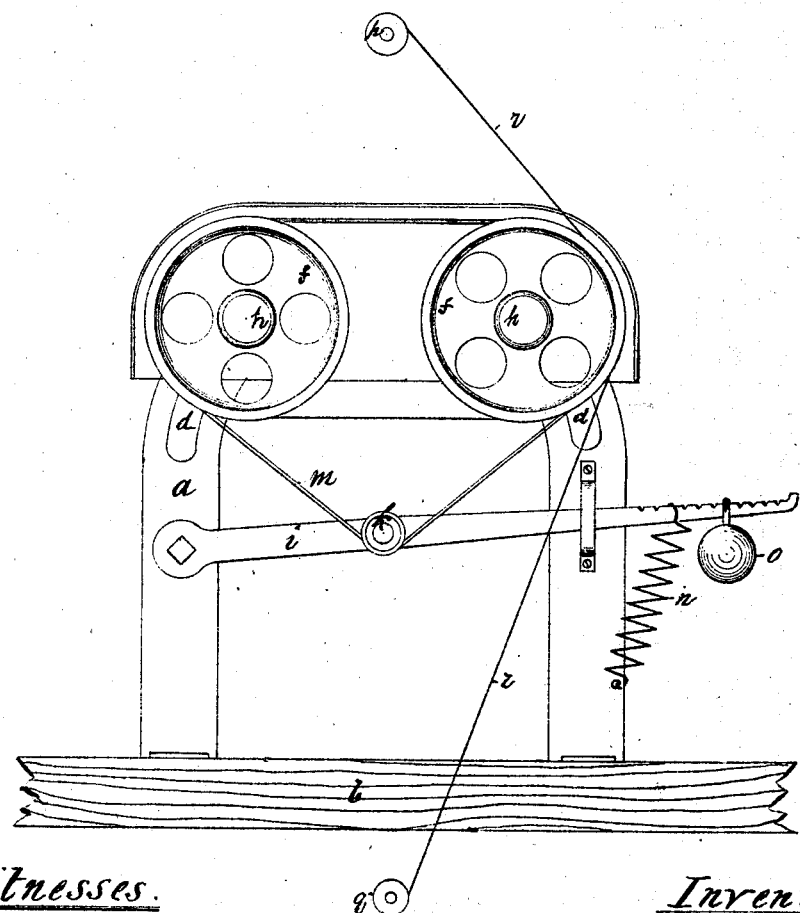

In the accompanying drawing, Figure 1 is a sectional view cut through the rollers. Fig. 2 shows the working position of the rollers, and also showing how the tension is increased or diminished.

$a$ is a metal frame-work, which, when in use, is secured to the frame-work $b$ of the machine. $c\,c$ are stud-pins, which pass through the elongated openings $d\,d$ and are secured in an adjustable position to the frame $a$ by means of nuts $e$. $f\,f$ are channel or groove-rollers, all the channels $g$ in each roller being of the same diameter. These rollers are fitted to and revolve freely upon the stud-pins $c\,c$. These rollers may be removed, and replaced by taking off and replacing the cap-nuts $h$ on the stud-pins $c$. I is a lever, one end of which is secured to the frame $a$. This lever is provided with a groove-roller, $k$. A friction-band, $m$, is placed over the two rollers $f\,f$, and around the roller $k$, and a greater or less tension is brought to bear upon said rollers $f\,f$ through the band $m$ and lever $i$ by means of a spring, $n$, or weight $o$. $p$ is a bobbin or spool, upon which the silk is to be wound. $q$ is a spool, from which the silk is to be drawn. The spool $p$ is secured upon a positively-driven spindle. The silk thread $r$ is first taken from the spool $q$ upward once or more, over and around the rollers $f\,f$, thence to the spool $p$. Now it will be seen that, in consequence of the equal diameter of the rolls $f$, an equal and uniform tension is produced. The bobbin or spool $p$, in its positive motion, draws and stretches the thread as it passes once or more times over and around the rollers $f$ (which are of uniform size) from the spool $q$, thereby producing a smoother and more even thread, doing a larger amount of work in a given time, with much less waste in time and material.

I believe I have thus shown the nature, construction, and advantage of this invention, so as to enable others skilled in the art to make and use the same therefrom.

What I claim, therefore, and desire to secure by Letters Patent, is—

The groove-rollers $f\,f$, of uniform size, in combination with a regulating tension, substantially such as shown and set forth.

JOHN N. LEONARD. [L. S.]

Witnesses:
E. W. BLISS,
JEREMY W. BLISS.